United States Patent
Cho

(10) Patent No.: US 12,131,042 B2
(45) Date of Patent: Oct. 29, 2024

(54) MEMORY SYSTEM FOR MANAGING NAMESPACE USING WRITE POINTER AND WRITE COUNT, MEMORY CONTROLLER, AND METHOD FOR OPERATING MEMORY SYSTEM

(71) Applicant: SK hynix Inc., Icheon (KR)

(72) Inventor: Hung Yung Cho, Icheon (KR)

(73) Assignee: SK hynix Inc., Icheon (KR)

(*) Notice: Subject to any disclaimer, the term of this patent is extended or adjusted under 35 U.S.C. 154(b) by 46 days.

(21) Appl. No.: 18/061,386

(22) Filed: Dec. 2, 2022

(65) Prior Publication Data

US 2024/0004566 A1 Jan. 4, 2024

(30) Foreign Application Priority Data

Jun. 29, 2022 (KR) .................. 10-2022-0079551

(51) Int. Cl.
*G06F 3/06* (2006.01)

(52) U.S. Cl.
CPC ............ *G06F 3/064* (2013.01); *G06F 3/0647* (2013.01); *G06F 3/0658* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,586,385 | B1* | 2/2023 | Lercari | G06F 12/0246 |
| 2003/0161186 | A1* | 8/2003 | Aasheim | G06F 12/0246 |
| | | | | 711/E12.008 |
| 2003/0163630 | A1* | 8/2003 | Aasheim | G06F 3/0679 |
| | | | | 711/202 |
| 2003/0163631 | A1* | 8/2003 | Aasheim | G06F 12/0246 |
| | | | | 711/170 |
| 2003/0163632 | A1* | 8/2003 | Aasheim | G06F 12/0246 |
| | | | | 711/170 |
| 2003/0163633 | A1* | 8/2003 | Aasheim | G06F 3/0679 |
| | | | | 711/E12.008 |
| 2016/0070662 | A1* | 3/2016 | Ly | G06F 11/1076 |
| | | | | 711/169 |
| 2016/0188219 | A1* | 6/2016 | Peterson | G06F 12/0246 |
| | | | | 711/103 |
| 2016/0188221 | A1* | 6/2016 | Janik | G06F 3/0611 |
| | | | | 711/103 |
| 2019/0129842 | A1* | 5/2019 | Bennett | G06F 12/0246 |
| 2021/0081330 | A1 | 3/2021 | Bennett et al. | |
| 2021/0182166 | A1* | 6/2021 | Hahn | G06F 11/3034 |

(Continued)

FOREIGN PATENT DOCUMENTS

KR 10-2021-0125774 A 10/2021

*Primary Examiner* — Kevin Verbrugge

(57) ABSTRACT

A namespace among one or more namespaces in a memory system may be manage on the basis of a write pointer and a write count. The namespace may be managed by a memory controller of the memory system. The memory system may set the one or more namespaces, and may set, for each namespace, a write pointer indicating a position where a new data unit is to be written in that namespace and a write count indicating the number of times a data unit has been written or updated in that namespace. The memory system may determine to migrate one or more data units in a namespace based on the write pointer and the write count of that namespace.

12 Claims, 15 Drawing Sheets

(56) References Cited

U.S. PATENT DOCUMENTS

| | | | |
|---|---|---|---|
| 2022/0083273 A1* | 3/2022 | Saito | G06F 3/0688 |
| 2022/0391089 A1* | 12/2022 | Muthiah | G06F 3/0659 |
| 2022/0391115 A1* | 12/2022 | Muthiah | G06F 12/0607 |
| 2023/0103355 A1* | 4/2023 | Surianarayanan | G06F 3/064 |
| | | | 711/158 |

* cited by examiner

MEMORY SYSTEM FOR MANAGING NAMESPACE USING WRITE POINTER AND WRITE COUNT, MEMORY CONTROLLER, AND METHOD FOR OPERATING MEMORY SYSTEM

CROSS-REFERENCE TO RELATED APPLICATION

The present application claims priority under 35 U.S.C. § 119(a) to Korean Patent Application No. 10-2022-0079551 filed on Jun. 29, 2022, which is incorporated herein by reference in its entirety.

BACKGROUND

1. Technical Field

Various embodiments generally relate to a memory system for managing a namespace using a write pointer and a write count, a memory controller, and a method for operating a memory system.

2. Related Art

A memory system includes a data storage device that stores data on the basis of a request from a host, such as a computer, servers, a smartphone, a tablet PC, or other electronic device. Examples of memory systems span from a traditional magnetic-disk-based hard disk drive (HDD) to a semiconductor-based data storage device such as a solid state drive (SSD), a universal flash storage (UFS) device, or an embedded MultiMediaCard (eMMC) device.

The memory system may further include a memory controller for controlling a memory device. The memory controller may receive a command from the host and, on the basis of the received command, may execute the command or control read, write, or erase operations, or combinations thereof, on the memory devices in the memory system. To perform such operations, the memory controller may execute firmware operations.

Meanwhile, as the storage capacity of memory systems continues to increase, the memory system may support one or more namespaces so that the host can more efficiently use the memory system.

SUMMARY

Various embodiments are directed to a memory system, a memory controller and an operating method thereof, capable of reducing a cost required to, when data is likely to be intermittently updated in one or more namespaces, manage the corresponding namespaces.

In an embodiment, a memory system may include: i) a memory device including a plurality of memory blocks each capable of storing a plurality of data units; and ii) a memory controller configured to set one or more namespaces, each namespace including at least one of the plurality of memory blocks, and set, for each of the namespaces, a respective write pointer indicating a position where a new data unit is to be written and a respective write count indicating a sum of a number of times new data units were written to the namespace and a number of times data units were updated in that namespace.

In an embodiment, a memory controller may include: i) a memory interface capable of communicating with a memory device including a plurality of memory blocks; and ii) a control circuit configured to configure one or more areas each including at least a respective one of the plurality of memory blocks, determine, for each of the areas, a position where a new data unit is to be written and a position where an update data unit for a previously stored data unit is to be written, determine, for each of the areas, a write count corresponding to a sum of a number of new data writes to that area and a number of data unit updates in that area, and manage each of the one or more areas based on the respective write count.

In an embodiment, a method for operating a memory system may include: i) setting one or more namespaces, each namespace including at least one memory block; ii) setting, for each of the namespaces, a write pointer indicating a position where a new data unit is to be written, and a write count indicating a sum of a number of times a data unit write has been performed and a number of times a data unit update has been performed; and iii) updating at least one of a write pointer of a first namespace among the one or more namespaces and a write count of the first namespace when performing a data unit write or a data unit update in the first namespace.

According to the embodiments of the disclosed technology, it is possible to reduce a cost required to, when data is likely to be intermittently updated in one or more namespaces, manage the corresponding namespaces.

DETAILED DESCRIPTION

Figure 1:
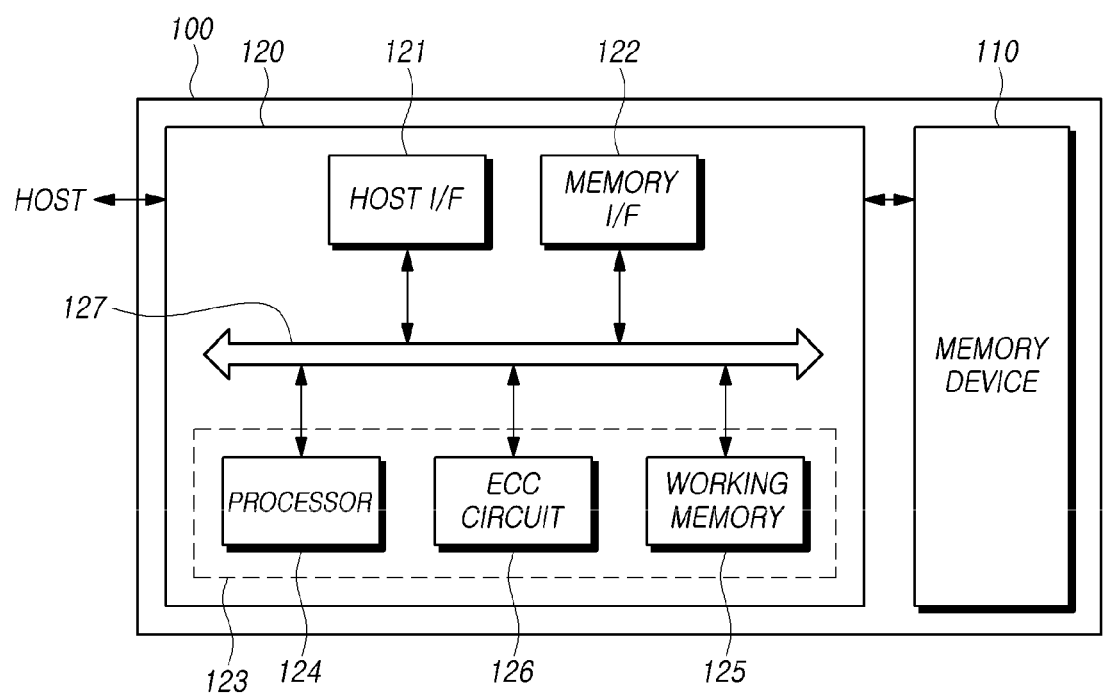
FIG. 1 schematically illustrates a configuration of a memory system based on an embodiment of the technology disclosed herein.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers and other signal generating and signal processing features may include, for example, a memory or other storage device for storing code or instructions to be executed, for example, by a computer, processor, microprocessor, controller, or other signal processing device.

FIG. 1 schematically illustrates a configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area indicated by the address. During the read operation, the memory device 110 may read data from a memory area indicated by the address. During the erasure operation, the memory device 110 may erase data stored in a memory area indicated by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in the absence of a request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

Firmware refers to a program or software that may be stored on a designated nonvolatile memory and that is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., a page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
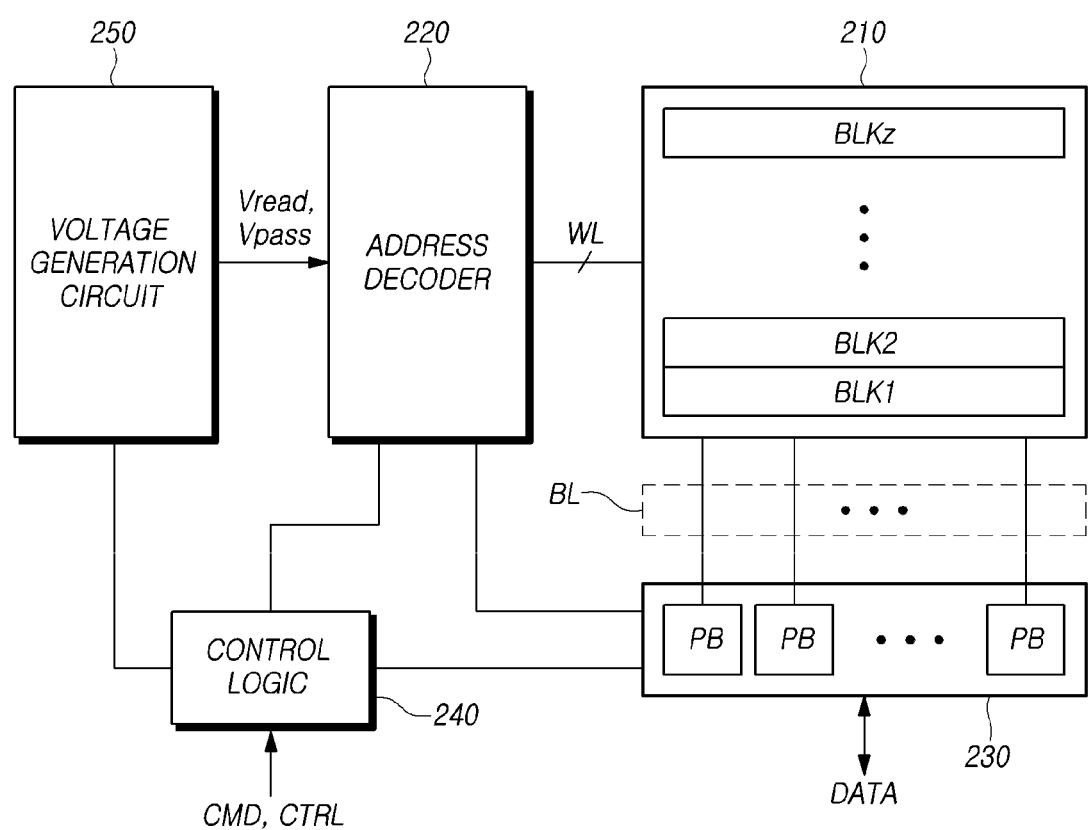
FIG. 2 schematically illustrates a memory device in accordance with an embodiment of the disclosed technology.

FIG. 2 schematically illustrates a memory device 110 in accordance with an embodiment of the disclosed technology.

The memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells may be nonvolatile memory cells. In some implementations, such nonvolatile memory cells may be arranged in a vertical channel structure.

In some implementations, the memory cell array 210 may be configured as a memory cell array having a two-dimensional structure. In other implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

During a program verification operation, the address decoder 220 may apply a verification voltage generated by the voltage generation circuit 250 to a selected word line WL inside a selected memory block, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the memory cell array 210. In some implementations, each memory cell may include a transistor that includes a material layer that can hold an electrical charge.

For example, a transistor in each memory cell may include a drain, a source, and a gate. The drain (or source) of the transistor may be connected to the corresponding bit line BL directly or via another transistor. The source (or drain) of the transistor may be connected to the source line (which may be the ground) directly or via another transistor. The gate of the transistor may include a floating gate surrounded by an insulator, and a control gate to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
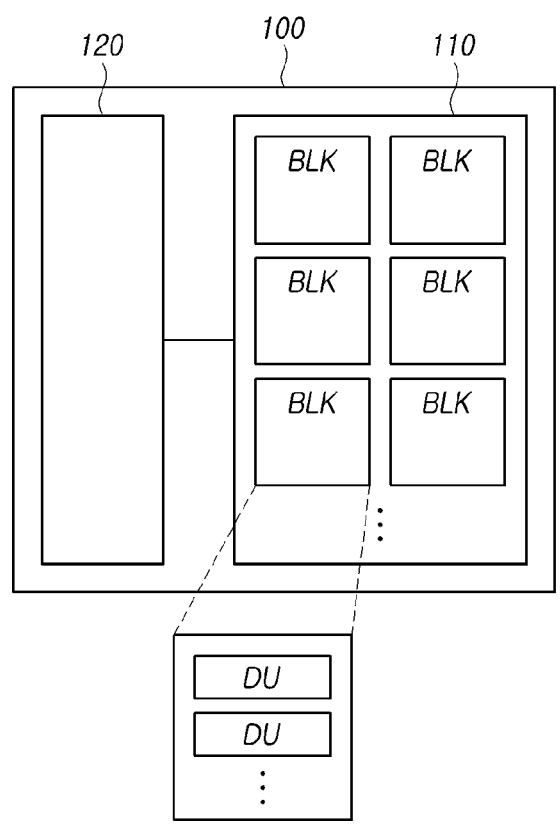
FIG. 3 schematically illustrates a memory system based on an embodiment of the disclosed technology.

FIG. 3 schematically illustrates a memory system 100 based on an embodiment of the disclosed technology.

Referring to FIG. 3, the memory system 100 may include a memory device 110 and a memory controller 120.

The memory device 110 may include a plurality of memory blocks BLK. Each of the plurality of memory blocks BLK may store a plurality of data units DU.

In embodiments, the size of each data unit DU may be the same as or a multiple of the size of a page included in each of the plurality of memory blocks BLK.

The memory controller 120 may provide one or more namespaces in the memory device 110. Hereinafter, this will be described in detail with reference to FIG. 4.

Figure 4:
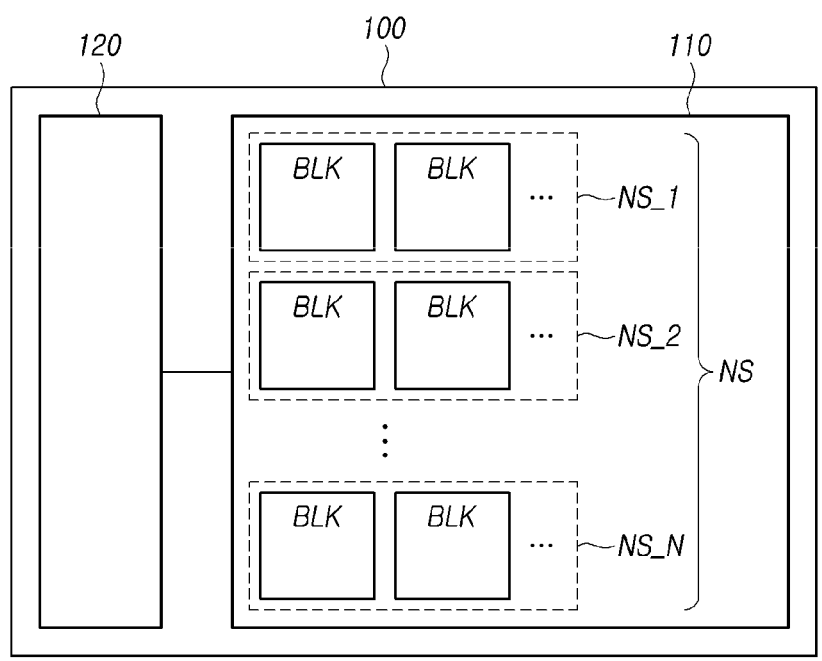
FIG. 4 illustrates an operation in which a memory system sets one or more namespaces based on an embodiment of the disclosed technology.

FIG. 4 illustrates an operation in which the memory system 100 configures one or more namespaces NS based on an embodiment of the disclosed technology.

Referring to FIG. 4, the memory controller 120 of the memory system 100 may configure a number of namespaces N (N is a natural number) namespaces NS_1, NS_2, . . . , NS_N in the memory device 110. Each of the namespaces NS_1, NS_2, . . . , NS_N may include at least one of the plurality of memory blocks BLK.

For example, when a specific memory block is included in a specific namespace, the entirety of that memory block may be used for that namespace.

For another example, when a specific memory block is included in a specific namespace, only a part of the that specific memory block may be used for that specific namespace. That is to say, only a part of that specific memory block may be used for storing data to be stored in the that specific namespace, and the remainder of that specific memory block may be used for other purposes (e.g., storing data to be stored in another namespace).

When the data storage area of the memory device 110 is divided into a plurality of logical areas, each namespace refers to a corresponding logical area. The N namespaces NS_1, NS_2, . . . , NS_N may have the same size or different sizes, and may have the same protection type or different protection types.

Information on the size, protection type, etc. of each of the N namespaces NS_1, NS_2, . . . , NS_N may be provided by a device (e.g., a host) outside the memory system 100. The device outside the memory system 100 may recognize each of the N namespaces NS_1, NS_2, . . . , NS_N as different logical areas (or partitions). The device outside the memory system 100 may separately format each namespace.

FIG. 4 illustrates as an example a case where each of the namespaces NS_1, NS_2, . . . , NS_N includes at least two memory blocks BLK, but embodiments are not limited thereto, and a namespace may include only one memory block BLK.

Meanwhile, the memory blocks included in each namespace may be changed. In other words, a memory block included in a namespace may be evicted from that namespace. Also, a new memory block may be added to a namespace.

Based on an embodiment of the disclosed technology, the memory controller 120 of the memory system 100 may set a write pointer (WP) and a write count (WC) for each of the N namespaces NS_1, NS_2, . . . , NS_N.

The write pointer (WP) of a namespace is information indicating a position where a new data unit is to be written to in that namespace. The new data unit is a data unit to be first written to the corresponding namespace, that is, a data unit which does not correspond to a data unit previously stored in the corresponding namespace.

The write pointer (WP) of a namespace may in some embodiments indicate a position where a new data unit has most recently been written to that namespace, or may in some embodiments indicate a next position for writing the new data unit in that namespace.

For example, the write pointer (WP) of a namespace may be expressed in the form of a specific physical address or an index corresponding to a specific physical address, and may indicate a specific element (e.g., a page) of a specific memory block included in that namespace.

Based on the write pointer (WP) of a namespace, the memory controller 120 may determine a position where a new data unit is to be written to that namespace.

For example, the memory controller 120 may write a new data unit at a position which is indicated by the write pointer (WP) of a namespace or a position which is determined by adding a preset offset to a position indicated by the write pointer (WP) of that namespace.

The write count (WC) of a namespace is information indicating the number of times a data unit is written or updated to the corresponding namespace.

The write count WC of a namespace may be determined on the basis of a preset reference time point. Namely, the write count (WC) of a namespace may be determined according to the number of times a data unit is written or updated to the corresponding namespace after the reference time point. Accordingly, when a reference time point is changed, the write count (WC) of a namespace may also be changed.

A reference time point may be determined for each namespace. For example, a reference time point for a namespace may be a time point when the namespace is generated, a time point when the namespace is reset, or a time point when a migration operation for data units stored in the namespace is performed.

Figure 5:
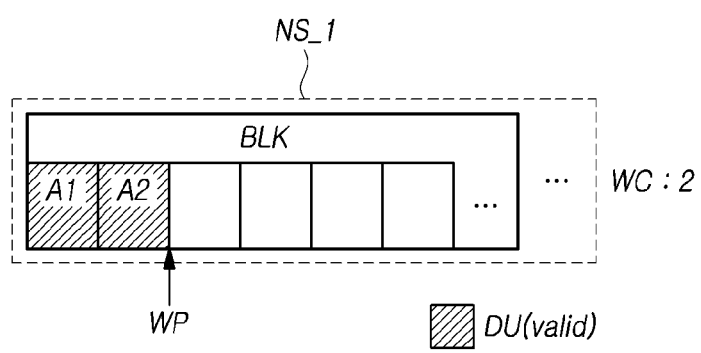
FIG. 5 illustrates a write pointer and a write count of a namespace based on an embodiment of the disclosed technology.

FIG. 5 illustrates a write pointer WP and a write count WC of a namespace based on an embodiment of the disclosed technology.

In FIG. 5, data units A1 and A2 have been written to a memory block BLK included in a first namespace NS_1 which is one of the aforementioned N namespaces NS_1, NS_2, ..., NS_N. Both the data units A1 and A2 are valid data units.

The write pointer WP of the first namespace NS_1 indicates a position next to the position of the data unit A2 which was last written to the first namespace NS_1. Accordingly, when a new data unit is additionally written to the first namespace NS_1, the new data unit is written next to the data unit A2.

The write count WC of the first namespace NS_1 indicates the number of times a data unit has been written or updated to the first namespace NS_1. That is, the write count WC indicates a sum of a number of data unit writes and a number of data unit updates performed for the first namespace NS_1 since a reference time point for the first namespace NS_1.

In FIG. 5, since the two data units A1 and A2 have been written to the memory block BLK included in the first namespace NS_1, the write count WC of the first namespace NS_1 may be set to 2.

Figure 6:
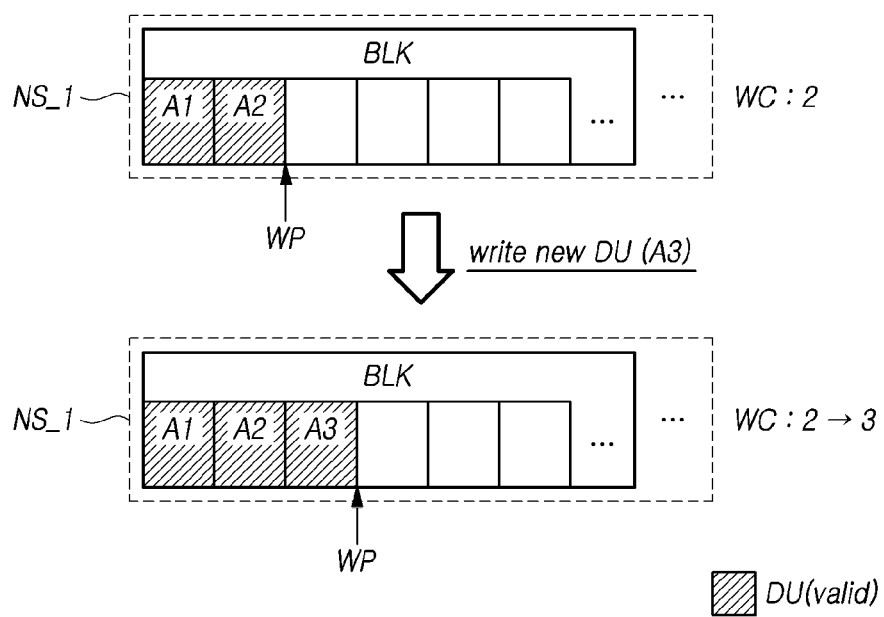
FIG. 6 illustrates an operation in which a memory system writes a new data unit to a namespace based on an embodiment of the disclosed technology.

FIG. 6 illustrates an operation in which the memory system 100 writes a new data unit to a namespace based on an embodiment of the disclosed technology.

In FIG. 6, a new data unit A3 is written to the first namespace NS_1. In embodiments, a logical address within the first namespace NS_1 of the data unit A3 is different than a logical address within the first namespace NS_1 of the data unit A1 and different than a logical address within the first namespace NS_1 of the data unit A2.

A position where the data unit A3 is to be written may be determined on the basis of the write pointer WP of the first namespace NS_1. In FIG. 6, the data unit A3 may be written at a position which is indicated by the write pointer WP of the first namespace NS_1.

After the data unit A3 is written to the first namespace NS_1, the memory controller 120 of the memory system 100 may update the write pointer WP of the first namespace NS_1 to indicate a position next to the position where the data unit A3 is written.

Furthermore, the memory controller 120 may increase the write count WC of the first namespace NS_1 from 2 to 3. This is because the data unit A3 has been additionally written to the first namespace NS_1.

Figure 7:
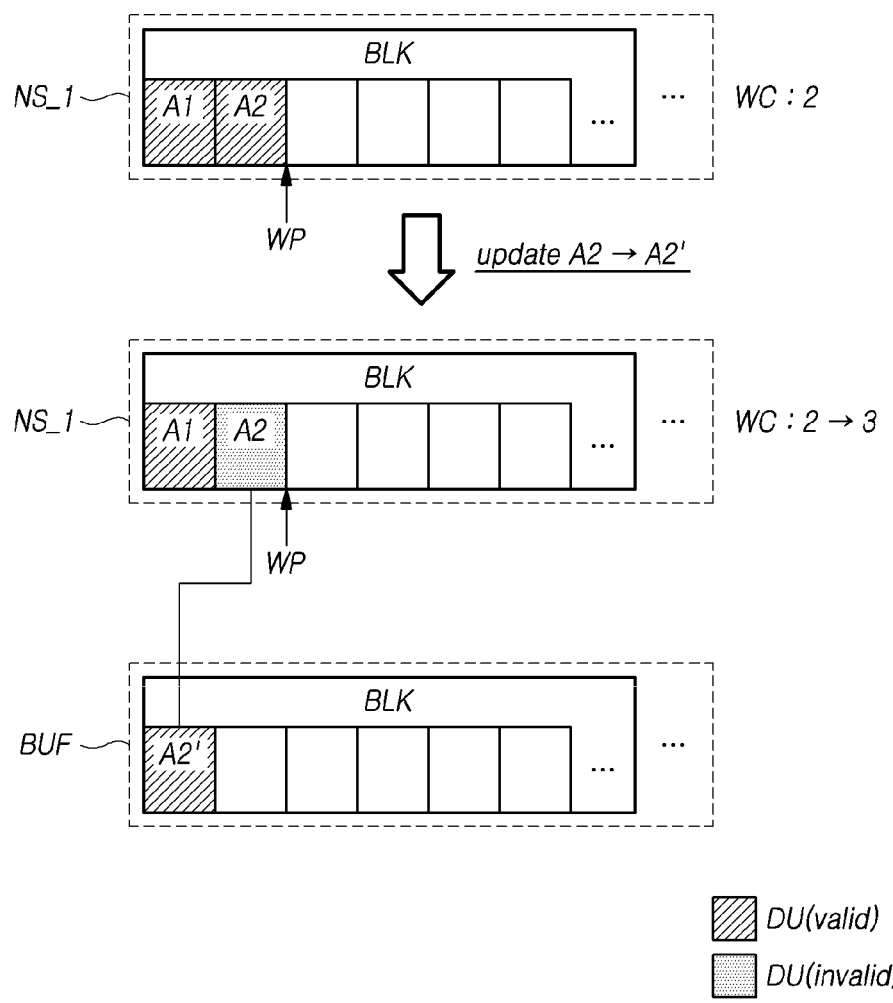
FIG. 7 illustrates an operation in which a memory system updates a data unit previously stored in a namespace based on an embodiment of the disclosed technology.

FIG. 7 illustrates an operation in which the memory system 100 updates a data unit previously stored in a namespace based on an embodiment of the disclosed technology.

In FIG. 7, the data unit A2 previously stored in the first namespace NS_1 is updated with a data unit A2'. In embodiments, a logical address within the first namespace NS_1 of the data unit A2' is the same as a logical address within the first namespace NS_1 of the data unit A2.

The data unit A2' is not overwritten at the position where the data unit A2 was previously stored and is not written at the position which is indicated by the write pointer WP of the first namespace NS_1.

Instead, the data unit A2' is written to a buffer BUF. The buffer BUF may include at least one of the plurality of memory blocks BLK included in the memory device 110.

Through this, when a data unit previously stored in the first namespace NS_1 is updated, the memory system 100 may manage an updated data unit through a separate buffer. Accordingly, the memory system 100 may reduce an overhead which is caused when a newly written data unit and an updated data unit are both stored in a memory block included in the first namespace NS_1.

While the buffer BUF is physically separated from the memory block included in the first namespace NS_1, the data unit A2' stored in the buffer BUF is a data unit which is considered to be stored in the first namespace NS_1.

The buffer BUF may store a data unit which is stored in the first namespace NS_1 along with a data unit which is stored in a different namespace.

Since the data unit A2' is written to the buffer BUF, the memory controller 120 of the memory system 100 may not update the write pointer WP of the first namespace NS_1 and instead maintains the write pointer WP as it is. However, since the data unit A2 previously stored in the first namespace NS_1 is updated with the data unit A2', the memory controller 120 may set the data unit A2 as an invalid data unit.

The memory controller 120 may increase the write count WC of the first namespace NS_1 from 2 to 3. This is because the operation of updating the data unit A2 with the data unit A2' has been additionally executed in the first namespace NS_1.

Figure 8:
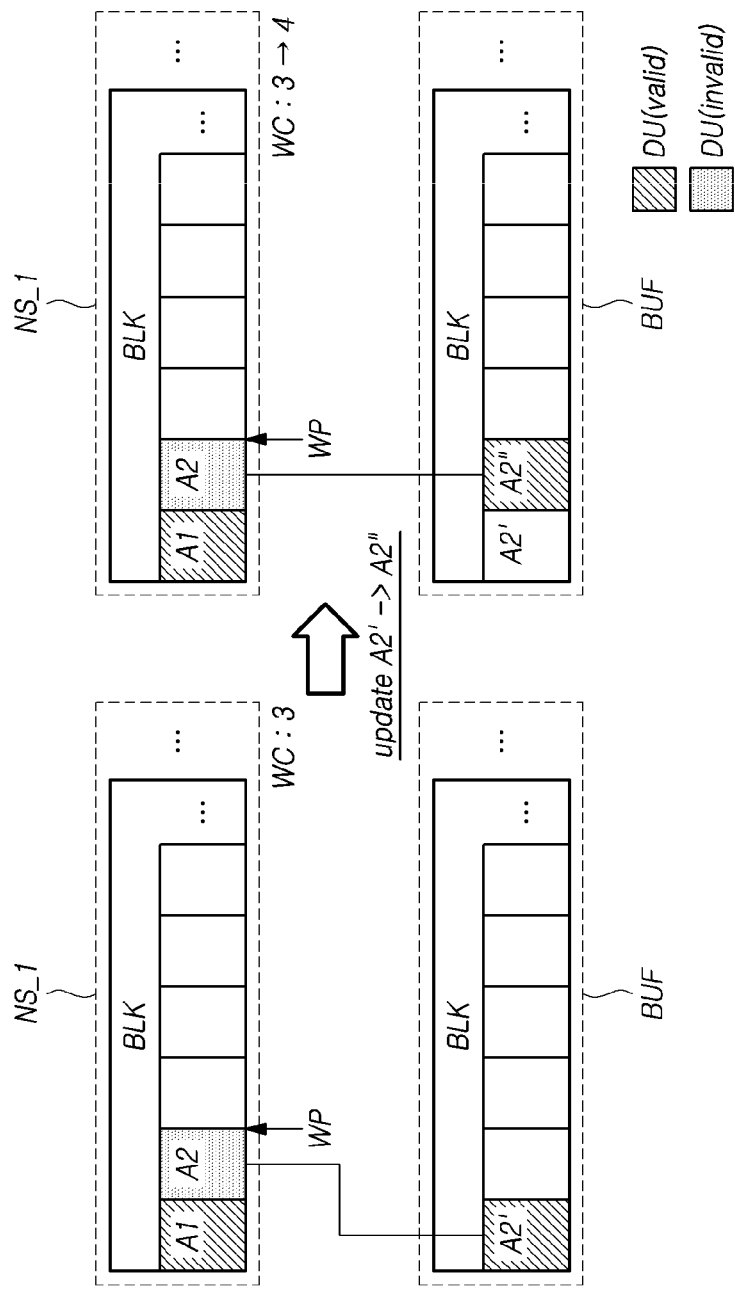
FIG. 8 illustrates another operation in which a memory system updates a data unit previously stored in a namespace based on an embodiment of the disclosed technology.

FIG. 8 illustrates another operation in which the memory system 100 updates a data unit previously stored in a namespace based on an embodiment of the disclosed technology.

In FIG. 8, after the data unit A2 previously stored in the first namespace NS_1 is updated with the data unit A2', the data unit A2' is updated again with a data unit A2".

The data unit A2" to be updated again is also not overwritten at the position where the data unit A2 is previously stored and is not written at the position which is indicated by the write pointer WP of the first namespace NS_1.

Like the data unit A2', the data unit A2" may also be written to the buffer BUF. The data unit A2" does not overwrite the data unit A2'. The data unit A2" may be written at a position next to a position where the data unit A2' is previously written to the buffer BUF, but embodiments are not limited thereto.

Since the data unit A2" is also written to the buffer BUF, the memory controller 120 of the memory system 100 may not update the write pointer WP of the first namespace NS_1 and may maintain that write pointer WP as it is. However, since the data unit A2' is updated with the data unit A2", the memory controller 120 may set the data unit A2' as an invalid data unit.

The memory controller 120 may increase the write count WC of the first namespace NS_1 from 3 to 4. This is because the operation of updating the data unit A2' with the data unit A2" has been additionally executed in the first namespace NS_1.

Figure 9:
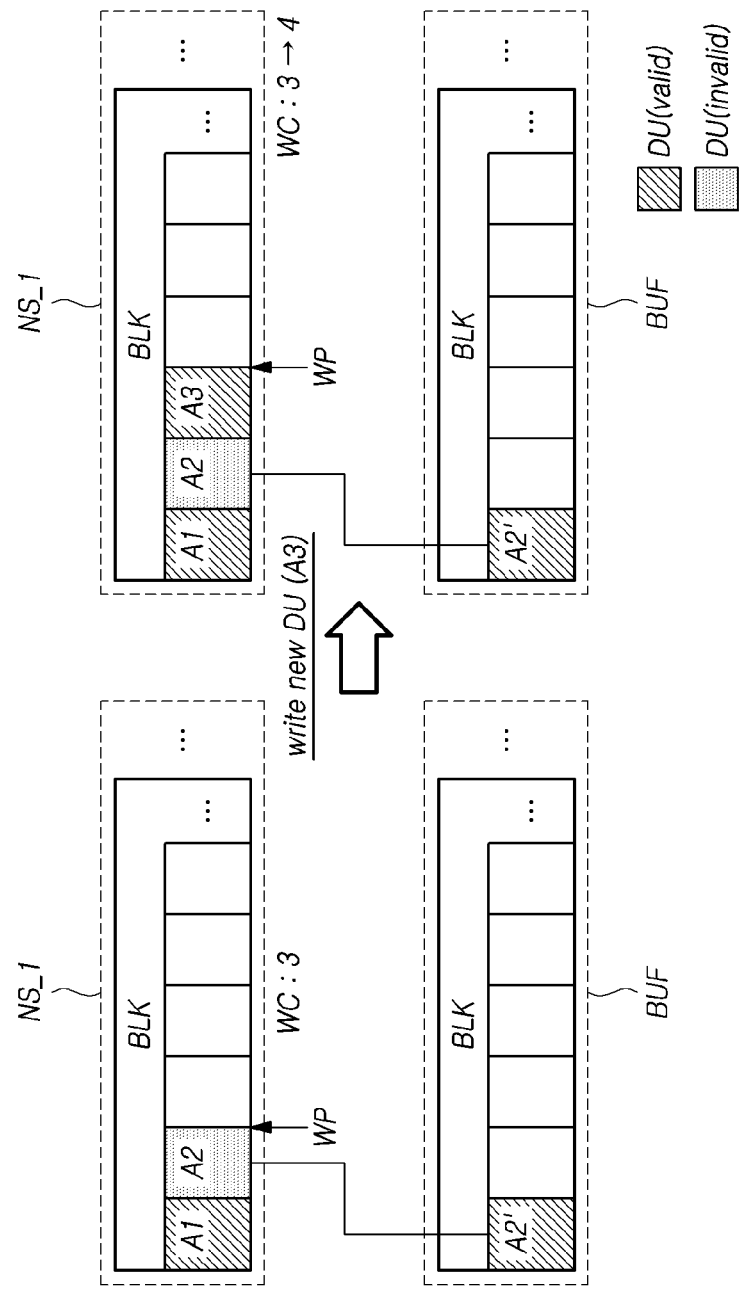
FIG. 9 illustrates an operation in which a memory system writes a new data unit to the namespace of FIG. 7 based on an embodiment of the disclosed technology.

FIG. 9 illustrates an operation in which the memory system 100 writes a new data unit to the namespace of FIG. 7 based on an embodiment of the disclosed technology.

In FIG. 9, a new data unit A3 is written to the first namespace NS_1.

The data unit A3 is written at the position which is indicated by the write pointer WP of the first namespace NS_1. Accordingly, the data unit A3 may be written at the position next to the position where the data unit A2 was written in the first namespace NS_1.

Meanwhile, the data unit A2 previously stored in the first namespace NS_1 had been updated with the data unit A2'. Accordingly, the data unit A2 had been set as an invalid data unit.

After the data unit A3 is written to the first namespace NS_1, the memory controller 120 of the memory system 100 may update the write pointer WP of the first namespace NS_1 to indicate a position next to the position where the data unit A3 is written.

Furthermore, the memory controller 120 may increase the write count WC of the first namespace NS_1 from 3 to 4. This is because the data unit A3 has been additionally written to the first namespace NS_1.

An operation of newly writing a data unit to a namespace or updating a previously stored data unit in the namespace has been described above.

If an operation of newly writing a data unit to a namespace or updating a previously stored data unit is repeated, the number of invalid data units stored in a memory block included in the that namespace may increase. Also, as the number of data units stored in a buffer increases, the size of the free space of the buffer may decrease.

Therefore, in order to remove invalid data units stored in a namespace, secure the free space of a buffer, or both, the memory system 100 may migrate all or a part of data units stored in the namespace to another memory block.

When a specific condition is satisfied, the memory controller 120 of the memory system 100 may migrate all or a part of data units stored in a namespace.

For example, when 1) a buffer stores at least one of data units considered to be stored in the namespace and is in a full state or 2) the write count (WC) of the namespace is equal to or greater than a preset first threshold and the number of times the data units stored in the namespace were updated is equal to or greater than a second threshold, the memory controller 120 may migrate all or a part of the data units stored in the namespace.

The fact that a buffer is in a full state means that a free space in which a data unit may be additionally written is no longer present in the buffer.

The number of times the data units stored in the corresponding namespace have been updated may be determined on the basis of the value of the write pointer (WP) of the corresponding namespace. For example, when the write pointer (WP) corresponds to an offset in data units from the beginning of the block, the number of times the data units have been updated may be equal to the difference between the write pointer (WP) and the write count (WC); however, embodiments are not limited to determining the number of times the data units have been updated in this manner.

Data units to be migrated may be valid data units.

Figure 10:
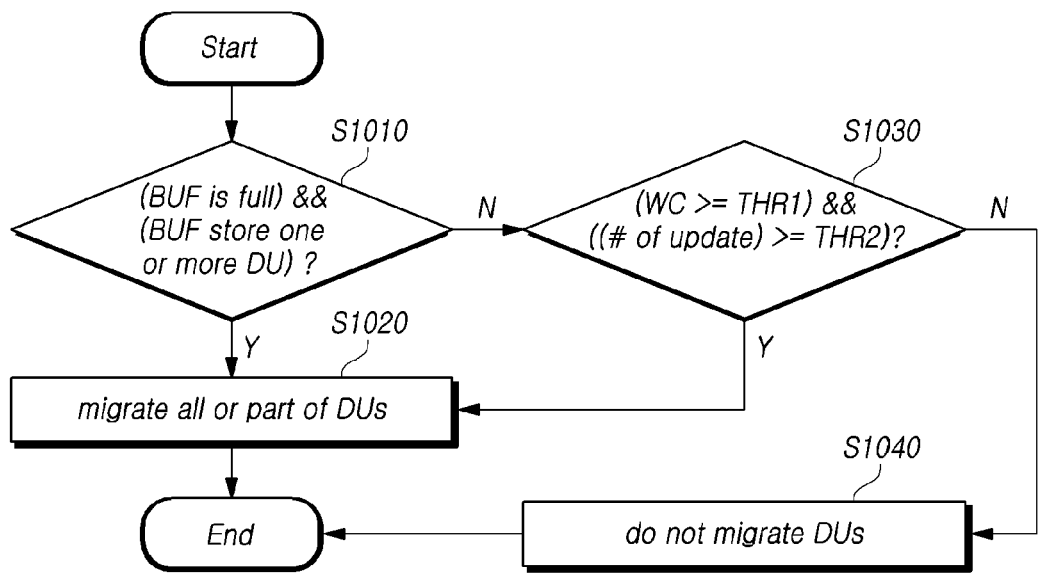
FIG. 10 is a flowchart illustrating an operation of determining, by a memory system, whether to migrate data units stored in a first namespace, based on an embodiment of the disclosed technology.

FIG. 10 illustrates determining, by the memory system 100, whether to migrate data units stored in the first namespace NS_1, based on an embodiment of the disclosed technology.

Referring to FIG. 10, the memory controller 120 of the memory system 100 determines whether the buffer BUF is in a full state and whether the buffer BUF stores at least one of data units considered to be stored in the first namespace NS_1 (S1010). In embodiments, determining whether the buffer BUF stores at least one of data units considered to be stored in the first namespace NS_1 is performed in response to determining that the buffer BUF is in the full state.

When the buffer BUF is in a full state and the buffer BUF stores at least one of the data units considered to be stored in the first namespace NS_1 (S1010—Y), the memory controller 120 may migrate all or a part of data units DU stored in the first namespace NS_1 (S1020).

On the other hand, when the buffer BUF is not in a full state or the buffer BUF does not store at least one of the data units considered to be stored in the first namespace NS_1 (S1010—N), the memory controller 120 determines whether the write count WC of the first namespace NS_1 is equal to or greater than a first threshold THR1 and whether the number of times data units stored in the first namespace NS_1 have been updated is equal to or greater than a second threshold THR2 (S1030). In embodiments, determining whether the number of times data units stored in the first namespace NS_1 have been updated is equal to or greater than a second threshold THR2 is performed in response to determining that the write count WC of the first namespace NS_1 is equal to or greater than a first threshold THR1.

When the write count WC of the first namespace NS_1 is equal to or greater than the first threshold THR1 and the number of times data units stored in the first namespace NS_1 have been updated is equal to or greater than the second threshold THR2 (S1030—Y), the memory controller 120 may migrate all or a part of the data units DU stored in the first namespace NS_1 (S1020).

On the other hand, when the write count WC of the first namespace NS_1 is less than the first threshold THR1 or the number of times data units previously stored in the first namespace NS_1 are updated is less than the second threshold THR2 (S1030—N), the memory controller 120 does not migrate any the data units DU stored in the first namespace NS_1 (S1040).

Hereinafter, illustrative embodiments in which the memory system 100 migrates all or a part of data units stored in a namespace will be described.

Figure 11:
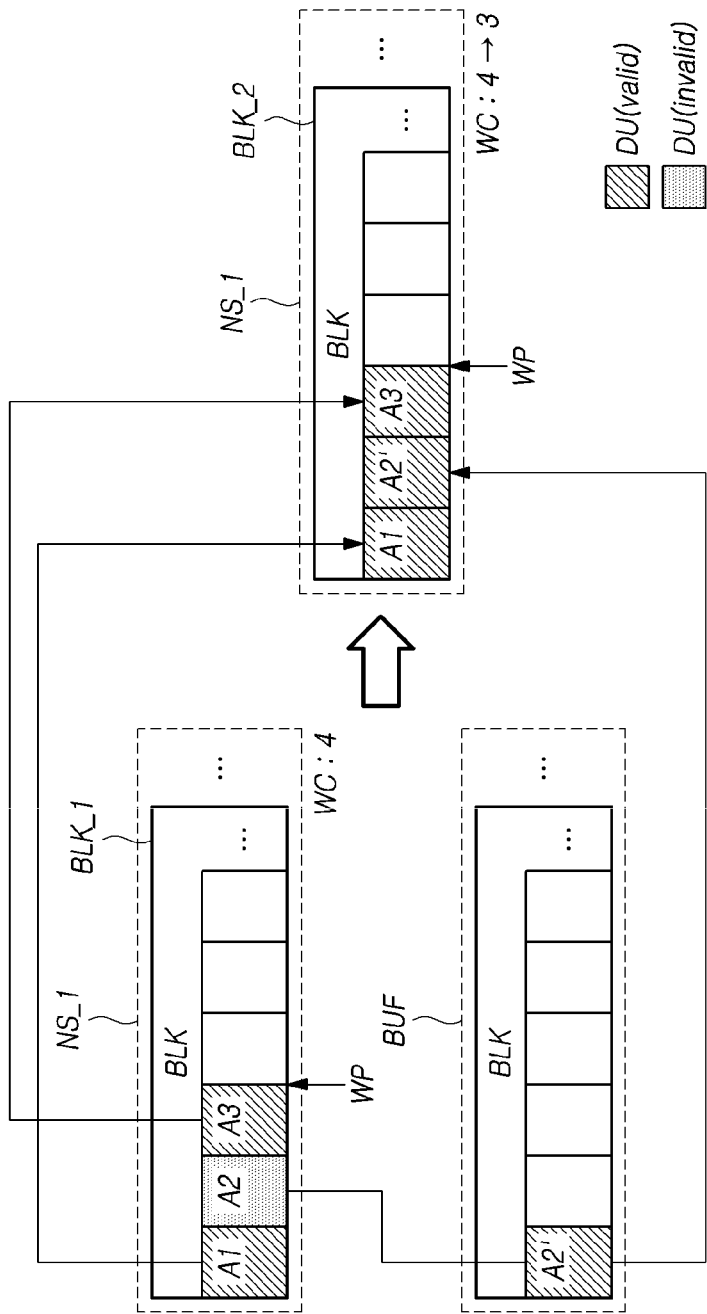
FIG. 11 illustrates an operation in which a memory system migrates data units stored in a namespace based on an embodiment of the disclosed technology.

FIG. 11 illustrates an operation in which the memory system 100 migrates data units stored in a namespace based on an embodiment of the disclosed technology.

In FIG. 11, data units A1, A2 and A3 are stored in a first memory block BLK_1 corresponding to the first namespace NS_1.

The data units A1 and A3, which have never been updated after they are written to the first namespace NS_1, are therefore valid data units. On the other hand, the data unit A2 is an invalid data unit because it has been updated with a data unit A2'. The data unit A2' is stored in the buffer BUF.

The write count WC of the first namespace NS_1 is 4. This is because the three data units A1, A2 and A3 have been written and the data unit A2 has been updated once with the data unit A2'.

The memory controller 120 of the memory system 100 may migrate all or a part of the data units A1, A2 and A3, stored in the first memory block BLK_1, to a second memory block BLK_2.

A data unit to be migrated from the first memory block BLK_1 to the second memory block BLK_2 may be a valid data unit. That is to say, the memory controller 120 may migrate only the valid data units A1 and A3 from among the data units A1, A2 and A3 stored in the first memory block BLK_1 to the second memory block BLK_2.

In addition, the memory controller 120 may migrate a data unit in the buffer BUF to the second memory block BLK_2 for any one of the data units A1, A2 and A3 stored in the first memory block BLK_1 that have been updated by a data unit in the buffer BUF. In this case, the data unit in the buffer BUF may be determined, for example, to be an update of one of the data units stored in the first memory block BLK_1 based on specific data structure (e.g. header corresponding to the data unit, mapping table indicating original data unit and update of the original data unit).

In FIG. 11, the data unit A2 has been updated with the data unit A2', and the data unit A2' is stored in the buffer BUF. Accordingly, the memory controller 120 may migrate the data unit A2', stored in the buffer BUF, to the second memory block BLK_2. The memory controller 120 may then set the data unit A2' stored in the buffer BUF as invalid. In embodiments, the data units are stored in the second memory block BLK_2 in an order corresponding to the order the data units were originally written to the first memory block BLK1, with updated data units taking the place of the data unit that they are an update of.

Thereafter, the memory controller 120 may add the second memory block BLK_2 to the first namespace NS_1.

All valid data units stored in the first memory block BLK_1 have been migrated to the second memory block BLK_2. Accordingly, in order to remove redundantly stored data units, the memory controller 120 may erase the first memory block BLK_1. Also, the memory controller 120 may evict the first memory block BLK_1 from the first namespace NS_1.

Since the three data units A1, A2' and A3 have newly been written to the second memory block BLK_2 as the migration is executed, the write count WC of the first namespace NS_1 may be updated to 3. The write pointer WP of the first namespace NS_1 may be updated to indicate a position next to a position where the last written data unit A3 is written.

In the above, an operation in which the memory system 100 migrates data units stored in one namespace has been described.

Hereinafter, an operation in which the memory system 100 migrates data units stored in two namespaces at the same time will be described.

Figure 12:
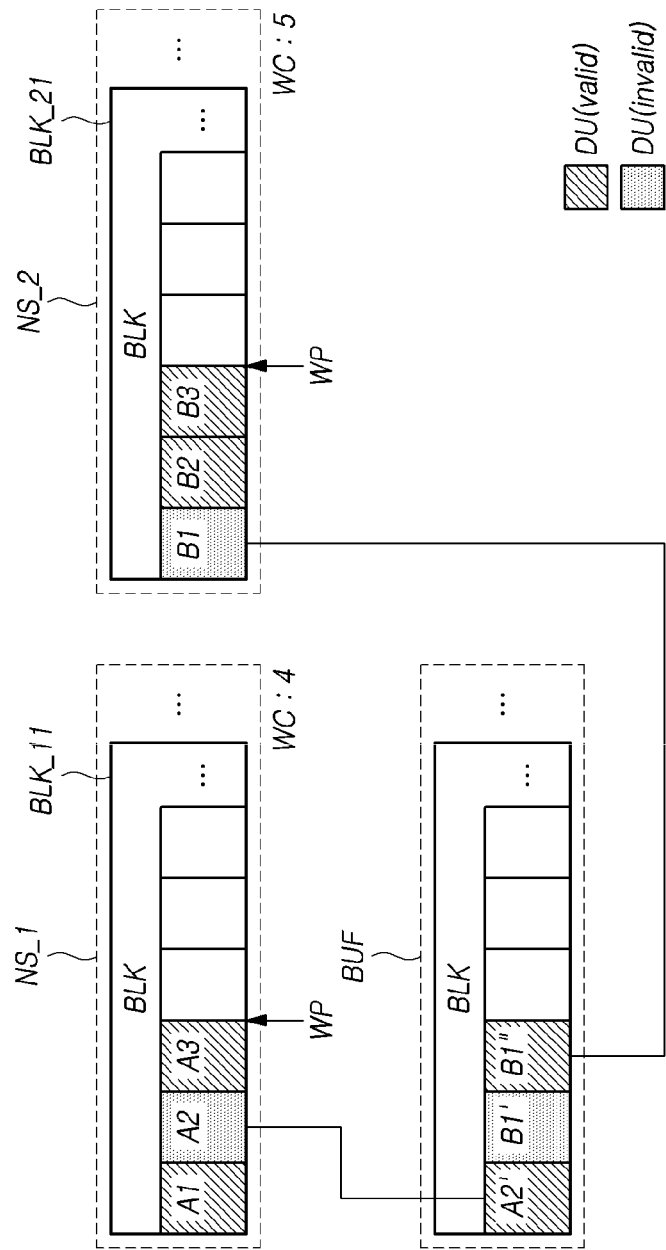
FIGS. 12 and 13 illustrate an operation in which a memory system migrates data units stored in two namespaces based on an embodiment of the disclosed technology.
Figure 13:
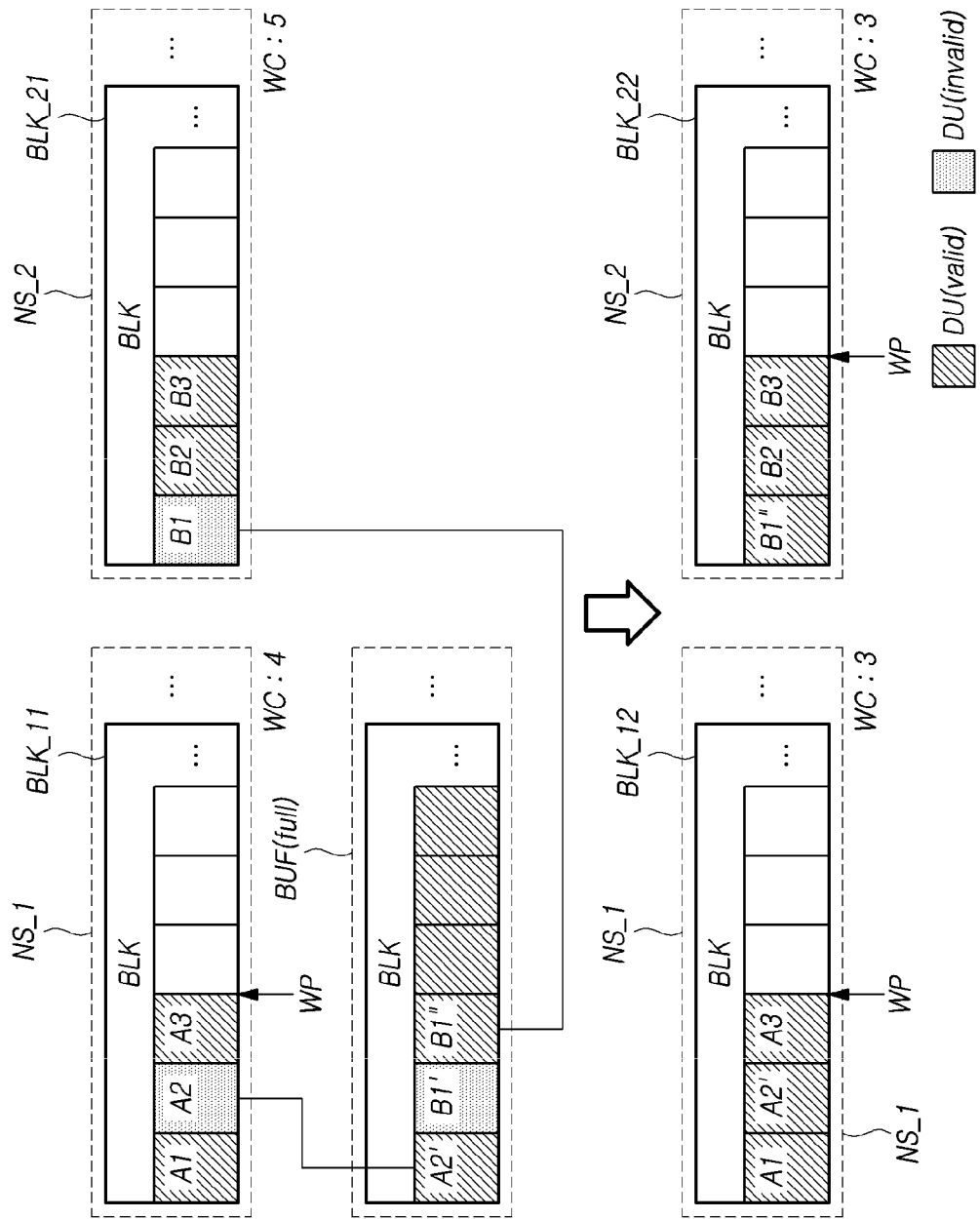

FIGS. 12 and 13 illustrate an operation in which the memory system 100 migrates data units stored in two namespaces NS_1 and NS_2 based on an embodiment of the disclosed technology.

Referring to FIG. 12, a first namespace NS_1 includes a memory block BLK_11. Three data units A1, A2 and A3 are stored in the memory block BLK_11.

The data units A1 and A3, which have never been updated after they are stored in the first namespace NS_1, are valid data units. On the other hand, the data unit A2 is an invalid data unit because it has been updated with a data unit A2'. The data unit A2' is stored in the buffer BUF.

The write count WC of the first namespace NS_1 is 4. This is because the three data units A1, A2 and A3 have newly been written and the data unit A2 has been updated once with the data unit A2'.

A second namespace NS_2 includes a memory block BLK_21. Three data units B1, B2 and B3 are stored in the memory block BLK_21.

The data units B2 and B3, which have never been updated, are valid data units. On the other hand, the data unit B1 is an invalid data unit because it has been updated with a data unit B1' and again with a data unit B1". The data units B1' and B1" are stored in the buffer BUF.

The write count WC of the second namespace NS_2 is 5. This is because the three data units B1, B2 and B3 have been written and the data unit B1 has been updated a total of two times with the data unit B1' and the data unit B1".

Referring to FIG. 13, when the buffer BUF is in a full state, because at least one data unit in the memory block BLK_11 (here, data unit A2) has been updated by a corresponding data unit in the buffer BUF (here, data unit A2'), the memory controller 120 of the memory system 100 may migrate all or a part of the data units A1, A2 and A3, stored in the memory block BLK_11 of the first namespace NS_1, to a memory block BLK_12. In an embodiment, the memory controller 120 of the memory system 100 may migrate all memory blocks having one or more data units that have been updated by corresponding data units in the buffer BUF to new respective memory blocks.

Data units to be migrated may be valid data units. In other words, the memory controller 120 may migrate only the valid data units A1 and A3 among the data units A1, A2 and A3 to the memory block BLK_12.

The data unit A2 has been updated with the data unit A2', and the data unit A2' is stored in the buffer BUF. Accordingly, the memory controller 120 may migrate the data unit A2', stored in the buffer BUF, to the memory block BLK_12.

Thereafter, the memory controller 120 may add the memory block BLK_12 to the first namespace NS_1.

Since the data units A1, A2' and A3 have newly been written to the memory block BLK_12 as the migration is executed, the write count WC of the first namespace NS_1 may be updated to 3. The write pointer WP of the first namespace NS_1 may indicate a position next to a position where the last written data unit A3 is written.

Also, because at least one data unit in the memory block BLK_21 (here, data unit B1) has been updated by a corresponding data unit in the buffer BUF (here, data unit B1' and subsequently data unit B1"), the memory controller 120 may migrate all or a part of the data units B1, B2 and B3, stored in the memory block BLK_21 of the second namespace NS_2, to a memory block BLK_22. Data units to be migrated may be valid data units. Namely, the memory controller 120 may migrate the valid data units B2 and B3 among the data units B1, B2 and B3 to the memory block BLK_22.

After the data unit B1 was updated with the data unit B1', the data unit B1' was updated again with the data unit B1". The data units B1' and B1" are stored in the buffer BUF. Among them, the memory controller 120 may migrate only the data unit B1", stored in the buffer BUF, to the memory block BLK_22. This is because the data unit B1' was updated by the data unit B1" and is therefore an invalid data unit.

Thereafter, the memory controller 120 may add the memory block BLK_22 to the second namespace NS_2.

Since the three data units B1", B2 and B3 have newly been written to the memory block BLK_22 as the migration is executed, the write count WC of the second namespace NS_2 may be updated to 3.

The write pointer WP of the second namespace NS_2 may indicate a position next to a position where the last written data unit B3 is written.

Figure 14:
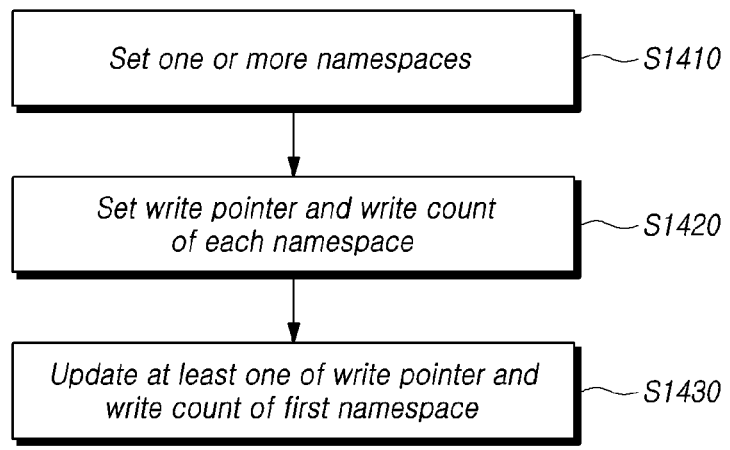
FIG. 14 is a flowchart illustrating an operation of a memory system based on an embodiment of the disclosed technology.

FIG. 14 is a flowchart illustrating an operation of the memory system 100 based on an embodiment of the disclosed technology.

Referring to FIG. 14, operating the memory system 100 may include setting N (N is a natural number) number of namespaces (S1410). Each namespace may include one or more memory blocks BLK. Each memory block may store a plurality of data units DU.

Operating the memory system 100 may include setting a write pointer and a write count for each namespace (S1420).

The write pointer of a namespace may be information indicating a position of a data unit which was last written to the corresponding namespace, or may be information indicating a position for writing a next data unit into the corresponding namespace. The write count of a namespace is information indicating the number of times a write of a data unit or an update of a data unit has occurred in the corresponding namespace. The write count may be relative to a reference time point of the corresponding namespace.

The method for operating the memory system 100 may include updating, when writing a new data unit to or updating a previously stored data unit in a first namespace among the namespaces, at least one of the write pointer and the write count of the first namespace (S1430).

The method for operating the memory system 100 may further include, when writing a new data unit to the first namespace, writing the new data unit at a position indicated by the write pointer of the first namespace.

The method for operating the memory system 100 may further include, when updating a data unit previously stored in the first namespace with an update data unit, writing the update data unit to a buffer BUF. The buffer BUF may include at least one memory block.

The method for operating the memory system 100 may further include migrating all or a part of data units stored in the first namespace when i) the buffer BUF stores at least one of data units considered to be stored in the first namespace and the buffer BUF is in a full state, or ii) the write count of the first namespace is equal to or greater than a preset first threshold and the number of times data units previously stored in the first namespace were updated is equal to or greater than a preset second threshold.

The migrating all or a part of data units stored in the first namespace may include i) migrating a valid data unit among data units stored in a first memory block BLK_1 included in the first namespace and a data unit last updated in the buffer BUF for any one of the data units stored in the first memory block BLK_1, to a second memory block BLK_2 and ii) adding the second memory block BLK_2 to the first namespace.

The method for operating the memory system 100 may further include, when the number of namespaces is equal to or greater than 2, the buffer BUF is in a full state, and a data unit updated for any one of data units stored in a second namespace among the namespaces is stored in the buffer BUF, migrating all or a part of the data units stored in the second namespace.

Figure 15:
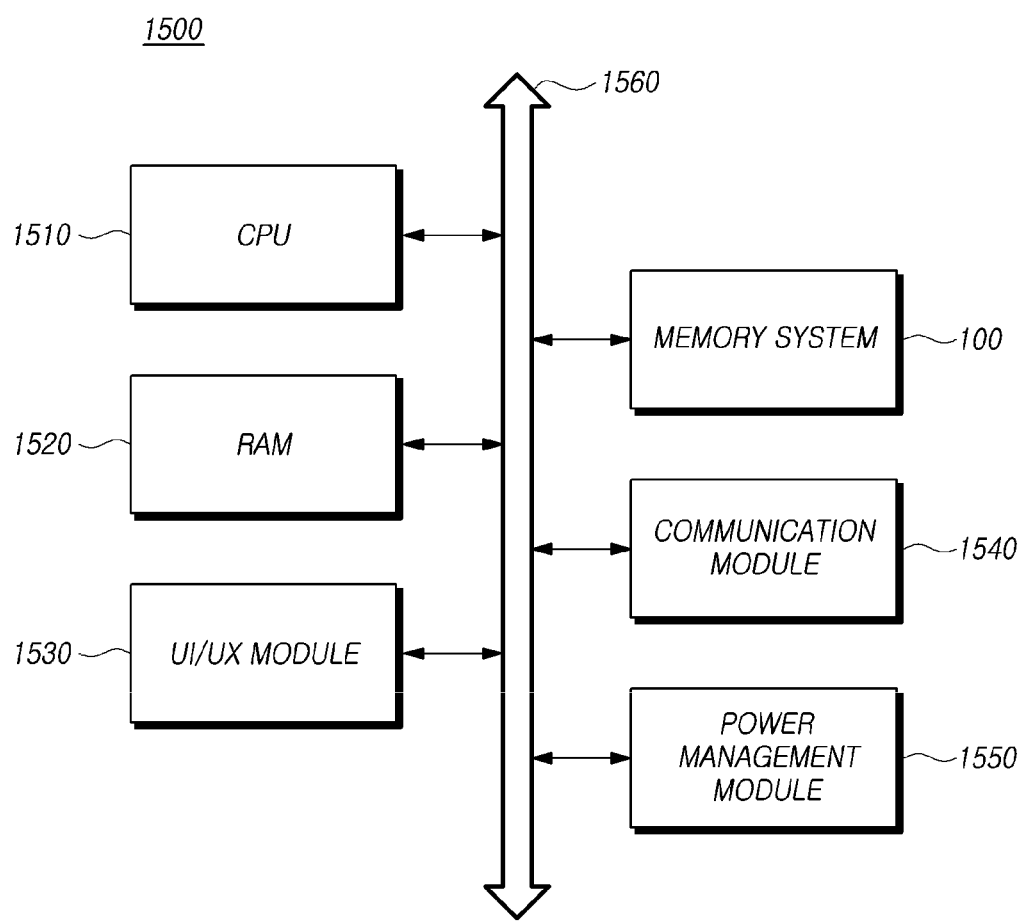
FIG. 15 illustrates a configuration of a computing system based on an embodiment of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include a device configured to store data in a magnetic disk such as a hard disk drive (HDD), a device configured to store data in a nonvolatile memory (such as a solid state drive (SSD), a universal flash storage device, or an embedded MMC (eMMC) device), or a combination thereof. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:
 a memory device including a plurality of memory blocks, each configured to store a plurality of data units; and
 a memory controller configured to:
  determine a plurality of namespaces, each namespace including at least one of the plurality of memory blocks, and
  determine, for each of the plurality of namespaces, a write pointer indicating a position where a new data unit is to be written and a write count indicating a sum of a number of times new data units were written to that namespace and a number of times data units were updated in that namespace
  wherein, when updating a data unit previously stored in a first namespace among the plurality of namespaces with an update data unit, the memory controller is configured to write the update data unit to a buffer including at least one memory block among the plurality of memory blocks, and to increase the write count of the first namespace without updating the write pointer of the first namespace.

2. The memory system according to claim 1, wherein when writing a new data unit to the first namespace, the memory controller writes the new data unit at a position which is indicated by a write pointer of the first namespace.

3. The memory system according to claim 1, wherein after writing the new data unit, the memory controller updates the write pointer of the first namespace to a position next to the position where the new data unit is stored, and increases a write count of the first namespace.

4. The memory system according to claim 1, wherein when the buffer stores at least one update data units corresponding to a data unit in the first namespace and the buffer is in a full state, or the write count of the first namespace is equal to or greater than a preset first threshold and the number of times data units were updated in the first namespace is equal to or greater than a preset second threshold, the memory controller migrates all or a part of data units stored in the first namespace.

5. The memory system according to claim 4, wherein migrating all or a part of data units stored in the first namespace comprises:
   migrating a valid data unit among data units stored in a first memory block included in the first namespace to a second memory block among the plurality of memory blocks;
   migrating a data unit in the buffer corresponding to an update of a data unit stored in the first memory block to the second memory block, and
   adding the second memory block to the first namespace.

6. The memory system according to claim 4, wherein when the buffer is in a full state and a data unit updated for any one of data units stored in a second namespace among the plurality of namespaces is stored in the buffer, the memory controller migrates all or a part of the data units stored in the second namespace.

7. A method for operating a memory system, the method comprising:
   setting one or more namespaces, each namespace including at least one memory block;
   setting, for each of the namespaces:
   a write pointer indicating a position where a new data unit is to be written, and
   a write count indicating a sum of a number of times a data unit write has been performed and a number of times a data unit update has been performed; and
   updating at least one of a write pointer of a first namespace among the one or more namespaces and a write count of the first namespace when performing a data unit write or a data unit update in the first namespace,
   wherein performing the data unit update in the first namespace comprises:
      updating a data unit previously stored in a first namespace with an update data unit by writing the update data unit to a buffer, the buffer including at least one memory block, and
      increasing the write count of the first namespace without updating the write pointer of the first namespace.

8. The method according to claim 7, wherein performing the data unit write in the first namespace comprises:
   writing a new data unit to the first namespace at a position which is indicated by the write pointer of the first namespace.

9. The method according to claim 7, further comprising:
   migrating all or a part of data units stored in the first namespace when:
   the buffer stores at least one update data unit written to the buffer by a data unit update in the first namespace and the buffer is in a full state, or
   the write count of the first namespace is equal to or greater than a preset first threshold and the number of times a data unit update has been performed in the first namespace is equal to or greater than a preset second threshold.

10. The method according to claim 9, wherein migrating all or a part of data units stored in the first namespace comprises:
    migrating a valid data unit stored in a first memory block included in the first namespace to a second memory block,
    migrating an update data unit stored in the buffer and corresponding to a data unit stored in the first memory block to the second memory block; and
    adding the second memory block to the first namespace.

11. The method according to claim 9, further comprising:
    when the buffer is in the full state and stores at least one update data unit written to the buffer by a data unit update in a second namespace among the one or more namespaces, migrating all or a part of the data units stored in the second namespace.

12. A memory controller comprising:
    a memory interface configured to communicate with a memory device including a plurality of memory blocks; and
    a control circuit configured to:
       configure one or more areas each including at least a respective one of the plurality of memory blocks,
       determine, for each of the areas, a position where a new data unit is to be written and a position where an update data unit for a previously stored data unit is to be written,
       determine, for each of the areas, a write count corresponding to a sum of a number of new data writes to that area and a number of data unit updates in that area, and
       manage each of the one or more areas based on the respective write count,
    wherein, when updating a data unit previously stored in a first area with an update data unit, the control circuit is configured to write the update data unit to a buffer including at least one memory block among the plurality of memory blocks, and to increase the write count of the first area without updating the write pointer of the first area.

* * * * *